(12) United States Patent
Morier et al.

(10) Patent No.: US 11,663,156 B1
(45) Date of Patent: May 30, 2023

(54) TWO-DIMENSIONAL OPTICAL SENSOR AND SERIAL PERIPHERAL INTERFACE ADAPTATION

(71) Applicant: Logitech Europe S.A., Lausanne (CH)

(72) Inventors: François Morier, Lausanne (CH); Berni Joss, Bussigny (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 17/871,639

(22) Filed: Jul. 22, 2022

Related U.S. Application Data

(60) Provisional application No. 63/329,760, filed on Apr. 11, 2022.

(51) Int. Cl.
*G06F 13/42* (2006.01)
*G06F 9/30* (2018.01)

(52) U.S. Cl.
CPC ...... *G06F 13/4291* (2013.01); *G06F 9/30098* (2013.01)

(58) Field of Classification Search
CPC .............. G06F 13/4291; G06F 9/30098
See application file for complete search history.

(56) References Cited

U.S. PATENT DOCUMENTS

| | | | | |
|---|---|---|---|---|
| 2015/0081940 A1* | 3/2015 | Levy | ..................... | G06F 13/364 710/110 |
| 2015/0378959 A1* | 12/2015 | Jones | ..................... | G06F 3/061 710/110 |
| 2020/0341934 A1* | 10/2020 | Abdul Kalam | ..... | G06F 13/1673 |
| 2022/0065695 A1* | 3/2022 | Siess | ..................... | G01J 3/4406 |

\* cited by examiner

*Primary Examiner* — Henry Tsai
*Assistant Examiner* — Kim T Huynh
(74) *Attorney, Agent, or Firm* — Kilpatrick Townsend & Stockton LLP

(57) ABSTRACT

A system can include a serial, full-duplex, synchronous peripheral communication interface composed of four communication lines that communicatively couple a host processor to an optical sensor, the four communication lines including: a clock (CLK) line; a chip select (CS) line; a host output (MOSI) line; and a sensor output (MISO) line, the MISO line operating according to the following conditions when the CS line is selected: provide a service register data indicating when one or more predetermined conditions have occurred prior to receiving any commands from the host processor; provide a state register data defining the one or more predetermined conditions that occurred; and in response to receiving a command from the host processor received after the service register data and state register data is provided, the command requesting input device operational data, provide the operational data to the host processor.

20 Claims, 5 Drawing Sheets

TWO-DIMENSIONAL OPTICAL SENSOR AND SERIAL PERIPHERAL INTERFACE ADAPTATION

CROSS-REFERENCES TO RELATED APPLICATIONS

This application is a non-provisional application and claims the benefit and priority of U.S. Provisional Application No. 63/329,760, filed on Apr. 11, 2022, and titled "TWO-DIMENSIONAL OPTICAL SENSOR AND SERIAL PERIPHERAL INTERFACE ADAPTATION," which is hereby incorporated by reference in its entirety for all purposes.

BACKGROUND

In conventional computer peripheral devices, operating a 2D sensor (e.g., an optical sensor on a computer mouse) with cordless operation typically requires saving power when users do not require full product operation to improve the operating life of the peripheral device between battery charges. To avoid wasting power by running continuously, 2D sensors can have reduced power modes, which can be a Rest Mode or Sleep Mode. When in a reduced power mode, the sensor may keep scanning the surface to detect motion but at a reduced rate. The optical sensor can keep checking for delta X/Y (e.g., movement along an underlying surface) at every surface scan or subset thereof, until a displacement (movement) is detected. The way the optical sensor warns the MCU is conventionally done by an extra line called a Motion line. The need for an extra pin, though commonly used, is generally not preferred.

BRIEF SUMMARY

In some embodiments, a system comprises: a host processor; an optical sensor for an input device, the optical sensor controlled by the host processor; and a serial, full-duplex, synchronous peripheral communication interface comprising four communication lines that communicatively couple the host processor to the optical sensor, the four communication lines including: a clock (CLK) line configured to transmit a clock signal from the host processor to the optical sensor; a chip select (CS) line configured to select the optical sensor and enable communication between the host processor and optical sensor; a host output (MOSI) line configured for transmitting command signals from the host processor to the optical sensor; and a sensor output (MISO) line configured for transmitting data signals from the optical sensor to the host processor, the MISO operating according to the following conditions when the CS line is selected: provide a service register data indicating when one or more predetermined conditions have occurred prior to receiving any commands from the host processor; provide a state register data defining the one or more predetermined conditions that occurred; and in response to receiving a command from the host processor received after the service register data and state register data is provided, the command requesting input device operational data, provide the operational data to the host processor. In some aspects, the CS line can be selected when a signal on the CS line is in a low state, and other embodiments may have the CS line configured to be selected when a signal line one CS line is in a high state. The predetermined conditions indicated by the service register may include at least one of a motion detection of the input device relative to an underlying surface, a lift state detection corresponding to a lifting of the input device off of the underlying surface, and a loss of correlation. In some aspects, the host processor provides a CLK signal on the CLK line after the service register data is provided. The input device can be a computer mouse, remote control, game controller, trackball controller, or the like, and the optical sensor (or other suitable sensor) can be configured to detect two-dimensional movement of the computer mouse along an underlying surface. The serial, full-duplex, synchronous peripheral communication interface may only include the four communication lines with no additional communication lines. In some embodiments, the optical sensor is polled by the host processor at a regular frequency and the service register data and state register data is provided when the CS line is selected. In some aspects, the optical sensor is polled by the host processor continuously and the service register data and state register data are provided when the CS line is selected. In some implementations, the host processor is in a low power state with the CS line selected such that activity detected by the optical sensor triggers reporting of the service register data and state register data.

Some embodiments may include a method of operating a computer mouse, the method including: generating service register data indicating when one or more predetermined conditions have occurred by an optical sensor on the computer mouse prior to receiving a data request commands from a host processor, the service register data generated by a serial, full-duplex, synchronous peripheral communication interface composed of four communication lines that communicatively couple the host processor to the optical sensor, the four communication lines including: a clock (CLK) line configured to transmit a clock signal from the host processor to the optical sensor; a chip select (CS) line configured to select the optical sensor and enable communication between the host processor and optical sensor; a host output (MOSI) line configured for transmitting command signals from the host processor to the optical sensor; and a sensor output (MISO) line configured for transmitting data signals from the optical sensor to the host processor, the MISO operating according to the following conditions when the CS line is selected, the optical sensor controlled by the host processor, generating state register data defining the one or more predetermined conditions that occurred; and in response to receiving a command from the host processor received after the service register data and state register data is provided, the command requesting input device operational data: providing the operational data to the host processor. The CS line can be selected when a signal on the CS line is in a low state, or in other embodiments, the CS line can be selected when a signal on the CS line is in a high state. The predetermined conditions indicated by the service register may include at least one of a motion detection of the input device relative to an underlying surface, a lift state detection corresponding to a lifting of the input device off of the underlying surface, and a loss of correlation. The host processor may provide a CLK signal on the CLK line after the service register data is provided. The input device may be a computer mouse, or any suitable input device described or implied in the present disclosure, and the optical sensor (and/or other suitable sensor, as described herein) is configured to detect two-dimensional movement of the computer mouse along an underlying surface. The serial, full-duplex, synchronous peripheral communication interface may only include the four communication lines with no additional communication lines. The optical sensor may be polled by the host processor at a regular frequency and the service register data and state register data is provided when the CS line is selected. The optical sensor may be polled by the host processor continuously and the service register data and state register data are provided when the CS line is selected. The host processor may be in a low power state with the CS line selected such that activity detected by the optical sensor triggers reporting of the service register data and state register data.

In further embodiments, a system comprises: a host processor and an optical sensor for an input device, the optical sensor controlled by the host processor; and a serial, full-duplex, synchronous peripheral communication interface including up to four communication lines that communicatively couple the host processor to the optical sensor, the up to four communication lines including: a clock (CLK) line configured to transmit a clock signal from the host processor to the optical sensor; a host output (MOSI) line configured for transmitting command signals from the host processor to the optical sensor; and a sensor output (MISO) line configured for transmitting data signals from the optical sensor to the host processor, the MISO operating according to the following conditions; provide a service register data indicating when one or more predetermined conditions have occurred prior to receiving any commands from the host processor; provide a state register data defining the one or more predetermined conditions that occurred; and in response to receiving a command from the host processor received after the service register data and state register data is provided, the command requesting input device operational data, provide the operational data to the host processor. Some embodiments may include a chip select (CS) line configured to select the optical sensor and enable communication between the host processor and optical sensor, and the MISO may operate as indicated above when the CS line is selected. In some embodiments, the CS line can be active high or active low. In some implementations, the SPI may operate without a CS line, as would be appreciated by one of ordinary skill in the art with the benefit of this disclosure.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which.

Throughout the drawings, it should be noted that like reference numbers are typically used to depict the same or similar elements, features, and structures.

DETAILED DESCRIPTION

Figure 1:
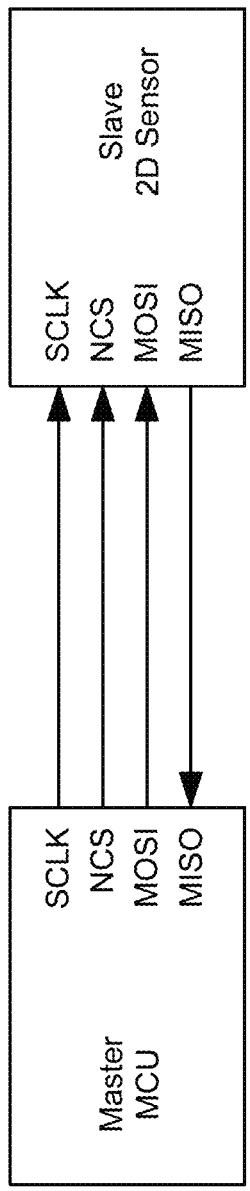
FIG. 1 shows a full duplex controller/agent serial peripheral interface (SPI) with a four-pin configuration, according to certain embodiments.

Aspects of the present disclosure relate generally to computer peripheral devices, and more particularly to a serial peripheral interface between one or more computer peripheral devices and a host computing device, according to certain embodiments.

In the following description, various examples of a novel approach to a serial peripheral interface are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high-level summary is intended to provide a basic understanding of some of the novel innovations depicted in the figures and presented in the corresponding descriptions provided below. Aspects of the invention relate to an optimized two-dimensional (2D) optical sensor design configured for low power operation with high tracking quality and extended surface coverage of an underlying surface (e.g., computer mouse operating on a work surface), with a reduced interconnect requirement and microcontroller unit (MCU) pin count using an improved serial peripheral interface (SPI) and State Register.

In summary, aspects of certain embodiments include some or all of the following characteristics: (1) no dedicated Motion line is needed in a full duplex SPI interface when operating a 2D sensor in cordless products with a wake-up on motion function; (2) multiple sensor situations can be combined and monitored on a MISO line (e.g., data flow from controller to agent—also non-preferably referred to as a master/slave architecture) while Chip Select (NCS) is set; (3) the MISO line returns to normal SPI communication at a first falling edge of SCLK; (4) the MISO line can be set as an interrupt to warn/wake up the MCU, with the NCS set low (set at 0) and SCLK set high (set at 1) prior to the MCU entering Sleep mode; and (5) the 2D sensor State register value is provided on the MISO line during first MOSI command (e.g., data flow from agent to controller) SCLK transaction.

Typically, operating a 2D sensor (e.g., an optical sensor on a computer mouse) with cordless operation requires saving power when users do not require full product operation. To avoid wasting power by running continuously, 2D sensors can have reduced power modes, which can be a Rest Mode or Sleep Mode. When in a reduced power mode, the sensor may keep scanning the surface to detect motion but at a reduced rate. Therefore, to save power, the mouse MCU may be placed in a low(est) power mode and configured to wait on a 2D sensor event to resume full operation, also referred to as "wake-up on motion." The optical sensor can keep checking for delta X/Y (e.g., movement along an underlying surface) at every surface scan or subset thereof, until a displacement (movement) is detected. Once a confirmed delta X/Y is different from zero (e.g., zero indicating no change/movement), the sensor can warn the MCU that there is accumulated delta X/Y larger than 0 to access. The way the optical sensor warns the MCU is conventionally done by an extra line called a Motion line.

In a full-duplex, controller-agent, Serial Peripheral Interface (SPI) (synchronous serial communication interface), as found in typical 2D optical sensors, four wires are used including: SCLK—clock driven by the controller (controller); NCS—chip select driven by controller to select agent (agent); MOSI—data flow from controller to agent; and MISO—data flow from agent to controller. FIG. 1 shows a full-duplex, controller-agent SPI with four communication lines, according to certain embodiments.

Figure 2:
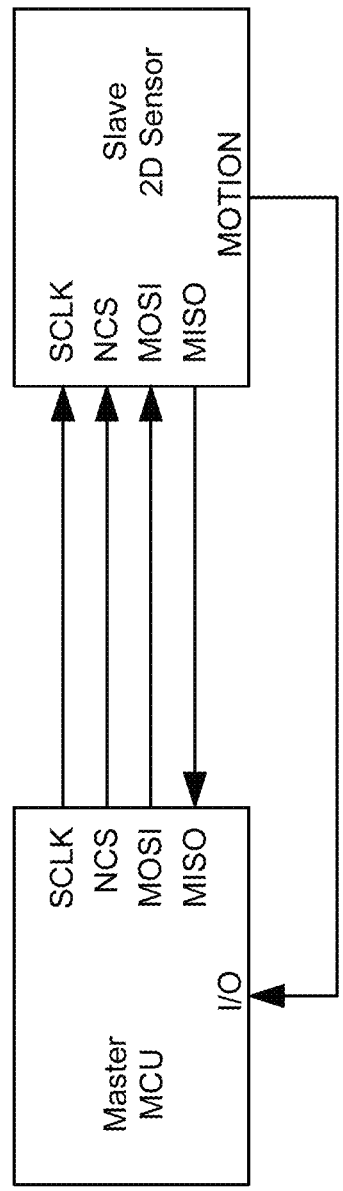
FIG. 2 shows a full duplex controller/agent SPI with a motion pin in a five-pin configuration, according to certain embodiments.

In some implementations, accounting for cordless 2D sensor operation typically requires an additional Motion pin for the reasons described above. FIG. 2 shows a full-duplex, controller-agent SPI with five communication lines, including the additional Motion line, according to certain embodiments. The additional line is not preferred, and aspects of the present invention are directed to achieving the functionality of a 5-line SPI in a 4-line implementation.

Operation of a 2D Optical Sensor in a 4-Line SPI Implementation

In normal operation, the sensor is polled at a rate that is at least equal to a corresponding USB polling rate, so displacement in delta X/Y registers are periodically cleared. Motion warning can be used in reduced power modes, for instance, while there is no active SPI communication. Embodiments of the invention can operate in the following manner: (i) the 2D sensor has a service register permitting to select several OR situations (e.g., delta X/Y not zero, lift state reached, loss of correlation); (ii) once a given selected situation happens it can be made visible by MISO going active (e.g., 1; logic high) when NCS is set (0); (iii) MISO line can return to normal SPI interface operation at first SCLK falling edge; and (iv) the MISO line can be used as an interrupt to warn/wake up the MCU, for that NCS is set low (e.g., 0; logic low) and SCLK set high (1) prior MCU entering Sleep mode. The optical sensor can also wake-up from Sleep mode if this was its state at the moment the situation was detected.

The State register may dynamically (e.g., flash rate based) indicate the status. The following conditions can be under watch: (1) Motion—new accumulated motion since last reading of delta X/Y is available; (2) Lift state—sensor detecting lift condition is met and no more X/Y displacement is accumulated; (3) Run—sensor is in running condition; (4) Rest1—sensor is in a first rest condition; (5) Rest2—sensor is in a second rest condition; (6) Sleep—sensor is in a sleep condition; (7) LoC—sensor could not find a correlation and has reset the reference frame; and (8) Ack—sensor operation is alive since last reading of X/Y. The State register value can be provided on MISO during the first MOSI command SCLK transaction.

Knowing when a lift state is met can be useful for mouse level operations (e.g., embedded software). Some LED indicators may be located on the bottom case of the computer mouse but for power saving reasons they typically may typically be turned on when the mouse is not in contact with the surface, among other lift conditions. As such, the 2D optical sensor lift state can be used to drive decisions in its embedded software. In some implementations, the lift state can be used to enable a mouse click filtering window at landing, which can help to avoid false clicks when the user slams the mouse while skating (e.g., picking up the computer mouse when a user moves it to an edge of a mouse pad and places it back in the center, often frequently, can cause vibrations in the key plate that may register as key presses). In some aspects, scroll wheel movement (e.g., ratchet mode, free wheel mode) can be filtered out while the computer mouse is lifted (e.g., wheel unbalance may cause spurious counts).

Using a full duplex SPI, the first eight MOSI transaction clocks to already receive data on the MISO line can be advantageously utilized. For example, the State register value is made available at every transaction start. Thus, the system can receive a response within a same clock cycle as making the request.

Figure 3:
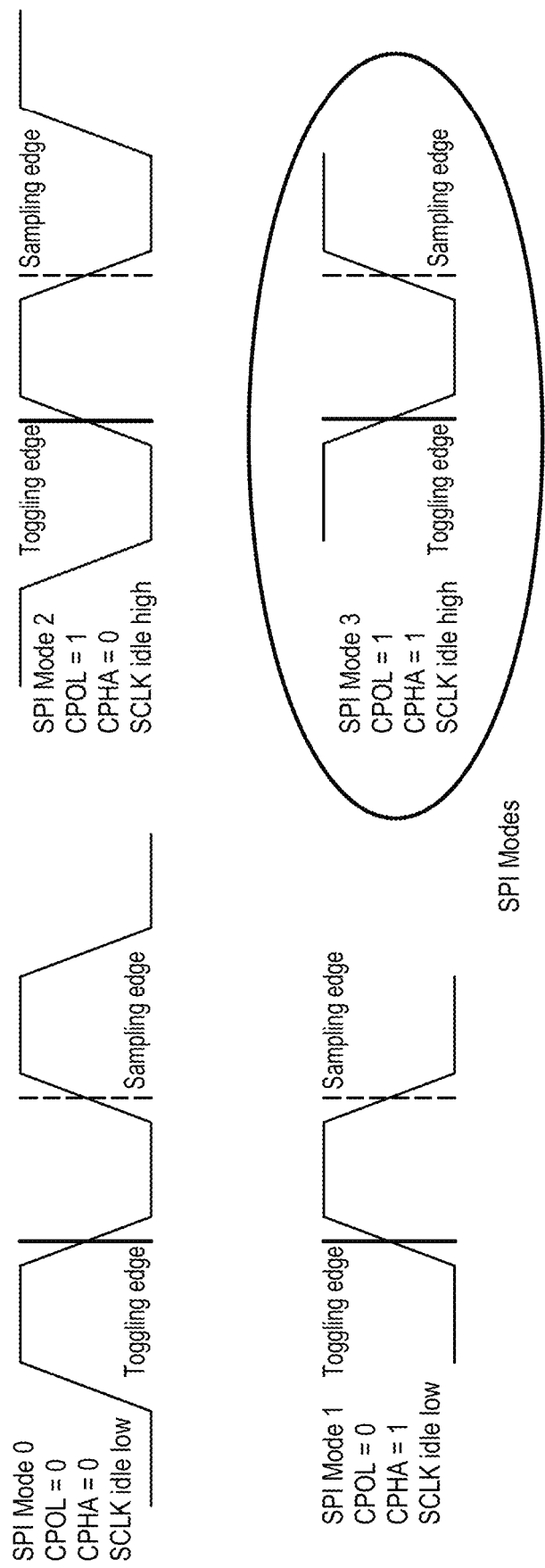
FIG. 3 shows timing diagrams depicting various SPI modes of operation, according to certain embodiments.

Several different modes of SPI operation are possible. FIG. 3 shows timing diagrams depicting various SPI modes of operation, according to certain embodiments. In some embodiments, for instance, the system may operate under SPI mode 3 where the clock idles at 1, clock polarity 1, and clock phase 1, as shown in FIG. 3. For each of the four SPI modes shown, there can be a defined Clock Polarity, Clock Phase and Clock idle state, and a mode is typically selected based on a particular convention that the user wants the SPI controller/agent to correspond to. One of ordinary skill in the art with the benefit of this disclosure would appreciate the many modifications, variations, and alternative embodiments thereof.

Figure 4:
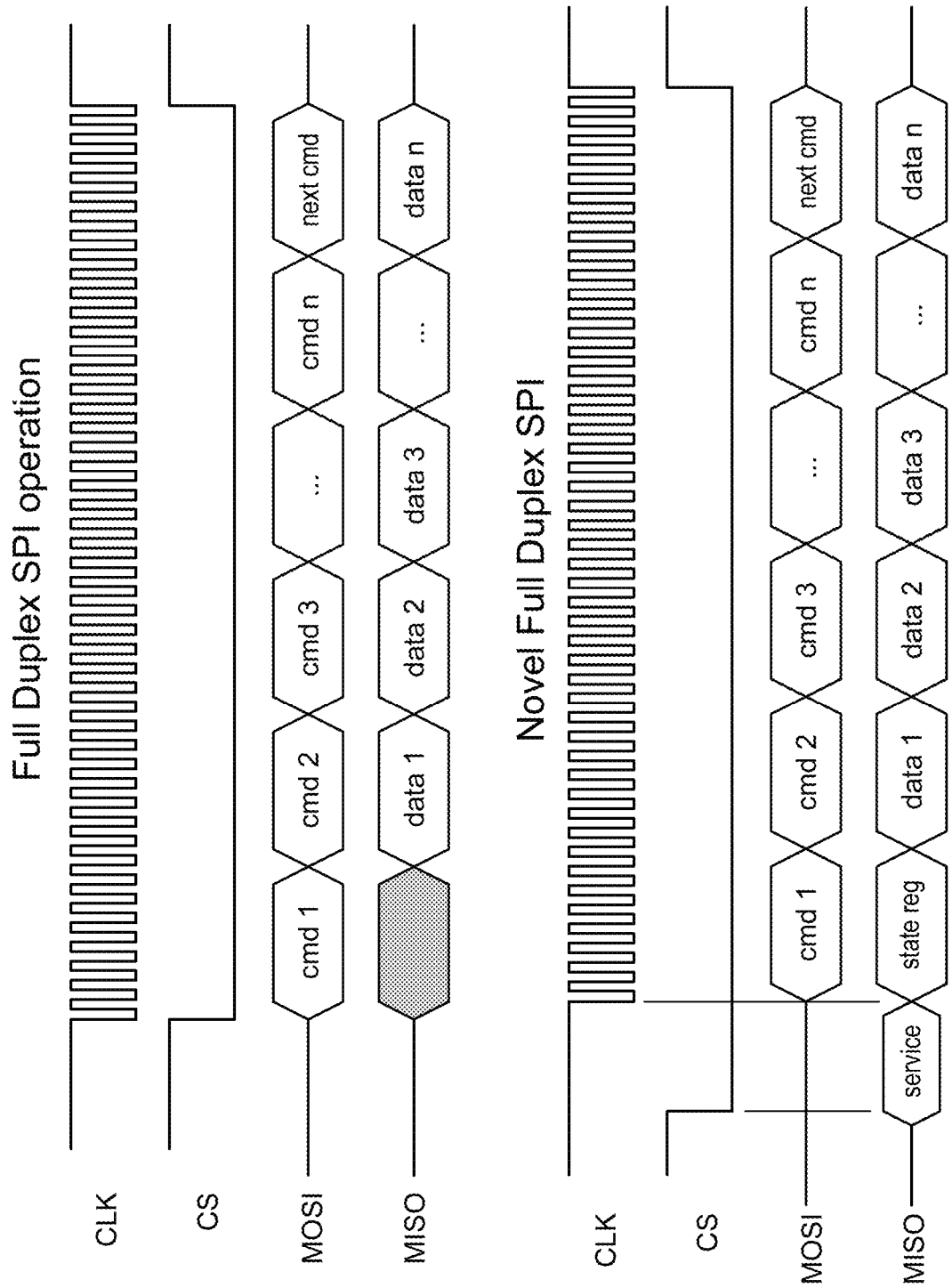
FIG. 4 shows an example of full-duplex SPI operation and full-duplex SPI operation with a novel service and state register, according to certain embodiments.

FIG. 4 shows an example of full-duplex SPI operation in the first timing diagram and full-duplex SPI operation with a novel service and state register in the second timing diagram, according to certain embodiments.

Figure 5:
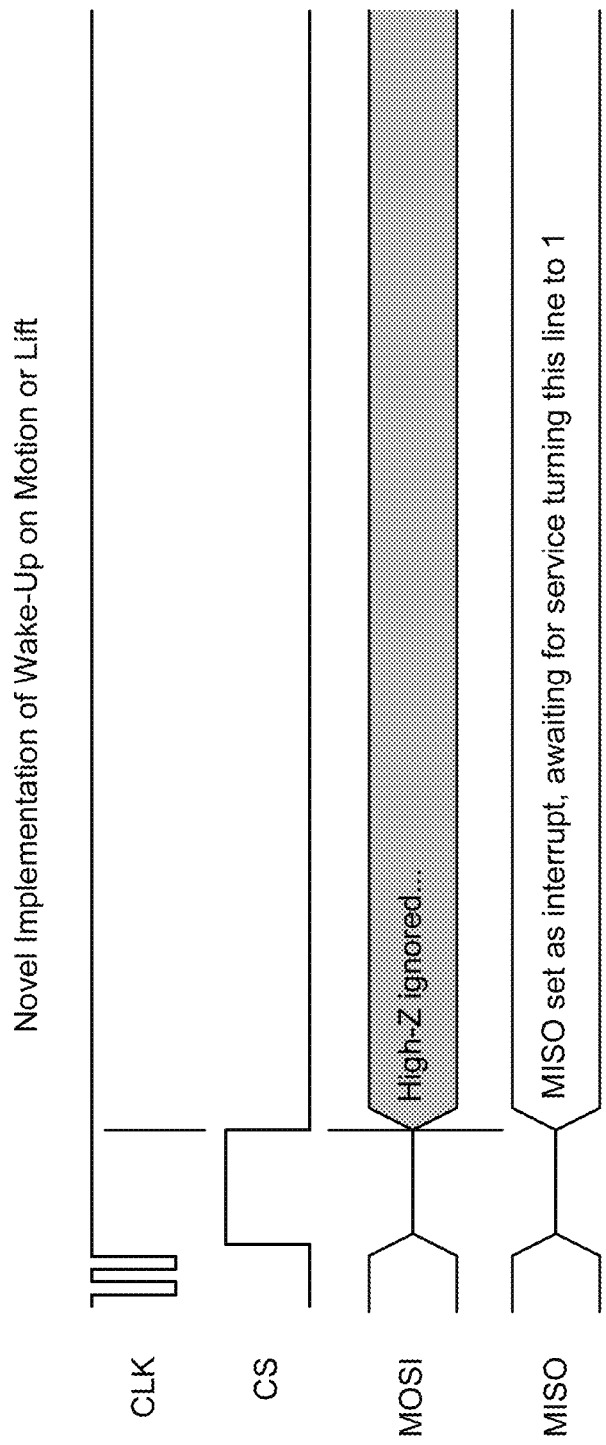
FIG. 5 shows a timing diagram comparing communication lines in a full-duplex SPI operation with wake-up on motion or lift functionality, according to certain embodiments.
Figure 6:
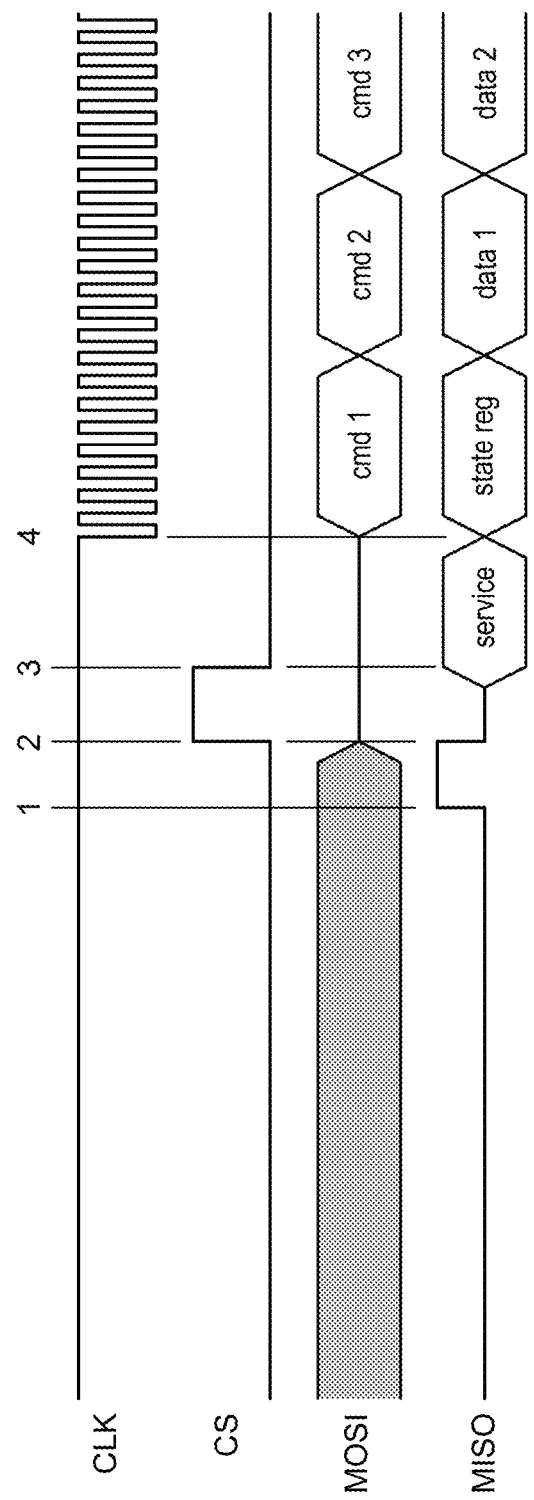
FIG. 6 shows a timing diagram comparing communication lines in a full-duplex SPI operation, according to certain embodiments.

FIG. 5 shows a timing diagram comparing communication lines in a full-duplex SPI operation with wake-up on motion or lift functionality, according to certain embodiments. The MISO line can be used as an interrupt to warn/wake up the MCU. FIG. 6 shows a timing diagram comparing communication lines in a full-duplex SPI operation, according to certain embodiments. In some embodiments, chip select (CS) is set low (0) and CLK set high (1) and prior to this the MCU can be configured with the MISO line operable to be used as an interrupt when the system (MCU) goes into a Sleep mode of operation. Once the MISO line turns high (point 1), MCU gets a service interrupt, CS is toggled (point 2) (point 3), and MCU resumes usual SPI polling operation (4). The optical sensor can also wake-up from Sleep if this is the state at the moment a situation is detected (e.g., X/Y non-zero, lift detect, etc.). At every SPI transaction start (point 3) service situation is visible prior first CLK falling edge (point 4). In some aspects, the State register value is provided on MISO during the first MOSI command SCLK transaction (point 4).

In some alternative embodiments, the sensor rest mode and motion pin may not be used to wake up the mouse after a period of non-use. In some cases, a main key press can be used to wake-up a computer mouse operation after a long rest state, though this is non-ideal. In other alternative embodiments, to save a pin (e.g., on the sensor side) a half-duplex SPI can be utilized, such that MOSI and MISO can be merged on a same pin (SDIO pin). In such cases, there is physically only one pin on the sensor side and an external resistor is used to discriminate MOSI, so there are still two discrete pins on the MCU. However, such solutions still require fives lines for SPI and Motion on the MCU side.

Although some embodiments may utilize a CS pulse, as shown in FIG. 6, they are not necessarily required. For example, in some embodiments, a firmware implementation may be simpler with a CS toggle, however other implementation may not use one with CS remaining low and MISO staying high (e.g., jumping from point 2 to 4), as would be appreciated by one of ordinary skill in the art with the benefit of this disclosure.

Problem/Solution Implementation of Certain Embodiments

Certain embodiments can employ a circuit architecture, as shown in FIG. 1, for SPI communication between Controller/Agent with lower power modes of operation, as described above. The system can use a 2D sensor as an interrupt to wake the system from low power modes of operation (e.g., sleep mode). For context, office workers typically operate a computer mouse for less than 10% of the time, with the computer mouse operating in a sleep mode (low power mode) for the remainder of the time. One solution is to have a wake-up function for the sensor because the sensor watches for motion and the microcontroller does not need to be active and can be configured to wake-up/activate when the sensor detects something (e.g., XY movement, lift detection, etc.). To do this properly, some embodiments use an additional $5^{th}$ pin (see, e.g., FIG. 2), which is an input/output line on the sensor that gets an interrupt signal when the computer mouse is in motion and requests a read motion in corresponding data registers. Preferred embodiments use four pins (as shown in FIG. 1), and the various embodiments presented herein describe the operation of a four pin SPI with wake-up on motion functionality.

In typical 4-pin SPI operation, you have chip select (CS), clocking (CLK), and afterwards first MOSI commands, then data sent from the peripheral via MISO. Nothing comes before that from MISO in conventional systems because no instructions are typically received at that point. Embodiments of the invention incorporate two changes to a typical 4-pin SPI architecture including a service flag and state register. For the service flag, with MISO the system looks for a specific change of state from no action to some activity (e.g., delta x/y not zero, lift state reached, loss of correlation, frame comparison, and more), so at CS the system (MCU) immediately knows if anything happened. In some embodiments, the service flag can indicate whether any particular state has occurred but may not provide operational details. In some cases, clocking can be held until a service flag occurs. The state register can include the status of the sensor and may define whether there was movement, lift detection, etc., as described above. This operation is different from conventional 4-pin SPIs because the system can operate without the motion pin because the system gets service information (the flag) and then knowledge of the internal state of the sensor (state register) without having to query the state register, which all occurs before any data is received from the computer mouse, as shown for example in FIG. 4. When CS is enabled, check service is activated. In some aspects, the MCU should be actively polling the optical sensor. In some aspects, CLK can be set to 1, CS set to 0, and the system can wait for an interruption of service. Thus, polling may commence and when CS is enabled the system knows whether there was an interruption of service before any commands are sent to the input device (e.g., computer mouse) or any data packets are received from the input device, such that the system can immediately decide on how to respond (e.g., enter sleep mode, keep CS enabled and track, switch to active mode, etc.) without waiting for data from the input device after CLK, CS, and a command on MOSI, as would be the case in conventional implementations. The system can be configured such that any condition will trigger a flag, including changes in x/y data (e.g., movement along 2 dimensions of an underlying surface), lift detection, or other scenarios/modes of operation. In certain embodiments, the optical sensor has a reference frame and every ~100 ms (10 Hz), or other suitable period of time) it takes an image and compares the latest two. In some cases, matching data would mean no change and thus no flag. If a change is detected, the flag can be triggered and the subsequent state register can indicate the corresponding condition that caused the flag (e.g., movement, lift detection, loss of correlation, etc.).

The system may operate under different polling schemes. For instance, in some embodiments, the MCU may be in sleep mode and may not poll the optical sensor, however with CS enabled the optical sensor may be configured to trigger the service flag. In another polling scheme, the optical sensor may be polled regularly and as soon as CS is enabled the MCU knows right away the state of the optical sensor before receiving any sensor data, thus a scan can be performed and zero X/Y change allows the MCU to avoid having to read any data and wasting power, cycles, etc. In another polling scheme, the MCU may be continuously polling with CS selected to always see the current state. As described above, the state register can communicate with the MCU within the first clock. Knowing if the optical sensor is in a lift state is not just useful for sensing, but also interesting from a user interface aspect as some products have lights or other output features. If the MCU knows that the device is in a lift state, you can turn on bottom lights, or otherwise keep them off to save power. Thus, getting state information is automatic and immediate, and does not interfere with normal MISO operations.

Although many of the embodiments described and depicted herein are directed to systems with SPI operation with an optical sensor, it should be understood that aspects of the invention may apply to any suitable sensor or suite of sensors. For example, a method of providing a <service> and <state> via MISO line is not restricted to optical sensors, but can be applied to other SPI peripherals, such as other type of sensors (e.g., magnetic, acceleration, etc.), GPIO expanders, devices (e.g., trackball, presenter, computer mouse, remote control, game controller, etc.) and more, as would be appreciated by one of ordinary skill in the art with the benefit of this disclosure.

In some embodiments, CS can be configured to be active low, however it should be understood that some embodiments may operate in a CS active high configuration. This can be true for Service polarity, Service drive via push/pull or open drain architectures, and more, such that the embodiments depicted and described herein are not limiting and other configurations can be used that are still within the spirit and scope of the present disclosure, as would be appreciated by one of ordinary skill in the art with the benefit of this disclosure.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. F or example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A system comprising:
    a host processor; and
    an optical sensor for an input device, the optical sensor controlled by the host processor; and
    a serial, full-duplex, synchronous peripheral communication interface including up to four communication lines that communicatively couple the host processor to the optical sensor, the up to four communication lines including:
    a clock (CLK) line configured to transmit a clock signal from the host processor to the optical sensor;
    a chip select (CS) line configured to select the optical sensor and enable communication between the host processor and optical sensor;
    a host output (MOSI) line configured for transmitting command signals from the host processor to the optical sensor; and
    a sensor output (MISO) line configured for transmitting data signals from the optical sensor to the host processor, the MISO operating according to the following conditions when the CS line is selected:
        prior to receiving any commands from the host processor:
            a service register is configured to provide data to the host processor indicating when one or more predetermined conditions have occurred;
            a state register is configured to provide state register data to the host processor defining the one or more predetermined conditions that occurred; and
        after receiving a command from the host processor after the service register data and state register data is provided: the command requesting input device operational data, provide the operational data to the host processor, wherein the operational data is different than the service register data and the state register data.

2. The system of claim 1 wherein the CS line is selected when a signal on the CS line is in a low state.

3. The system of claim 1 wherein the CS line is selected when a signal on the CS line is in a high state.

4. The system of claim 1 wherein the predetermined conditions indicated by the service register include at least one of a motion detection of the input device relative to an underlying surface, a lift state detection corresponding to a lifting of the input device off of the underlying surface, and a loss of correlation.

5. The system of claim 1 wherein the host processor provides a CLK signal on the CLK line after the service register data is provided.

6. The system of claim 1 wherein the input device is a computer mouse, and the optical sensor is configured to detect two-dimensional movement of the computer mouse along an underlying surface.

7. The system of claim 1 wherein the serial, full-duplex, synchronous peripheral communication interface does not include any additional communication lines.

8. The system of claim 1 wherein the optical sensor is polled by the host processor at a regular frequency and the service register data and state register data is provided when the CS line is selected.

9. The system of claim 1 wherein the optical sensor is polled by the host processor continuously and the service register data and state register data are provided when the CS line is selected.

10. The system of claim 1 wherein the host processor is in a low power state with the CS line selected such that activity detected by the optical sensor triggers reporting of the service register data and state register data.

11. A method of operating a computer mouse, the method comprising:
    generating service register data indicating when one or more predetermined conditions have occurred by an optical sensor on the computer mouse prior to receiving a data request commands from a host processor, the service register data generated by a serial, full-duplex, synchronous peripheral communication interface composed of four communication lines that communicatively couple the host processor to the optical sensor, the four communication lines including:
    a clock (CLK) line configured to transmit a clock signal from the host processor to the optical sensor;
    a chip select (CS) line configured to select the optical sensor and enable communication between the host processor and optical sensor;
    a host output (MOSI) line configured for transmitting command signals from the host processor to the optical sensor; and
    a sensor output (MISO) line configured for transmitting data signals from the optical sensor to the host processor, the MISO operating according to the following conditions when the CS line is selected, the optical sensor controlled by the host processor, prior to receiving any commands from the host processor:
- generating service register data indicating when one or more predetermined conditions have occurred;
- generating state register data defining the one or more predetermined conditions that occurred; and
- after receiving a command from the host processor after the service register data and state register data is provided:
  - providing the operational data to the host processor, wherein the operational data is different than the service register data and the state register data.

12. The method of claim 11 wherein the CS line is selected when a signal on the CS line is in a low state.

13. The method of claim 11 wherein the CS line is selected when a signal on the CS line is in a high state.

14. The method of claim 11 wherein the predetermined conditions indicated by the service register include at least one of a motion detection of the input device relative to an underlying surface, a lift state detection corresponding to a lifting of the input device off of the underlying surface, and a loss of correlation.

15. The method of claim 11 wherein the host processor provides a CLK signal on the CLK line after the service register data is provided.

16. The method of claim 11 wherein the input device is a computer mouse, and the optical sensor is configured to detect two-dimensional movement of the computer mouse along an underlying surface.

17. The method of claim 11 wherein the serial, full-duplex, synchronous peripheral communication interface only includes the four communication lines with no additional communication lines.

18. The method of claim 11 wherein the optical sensor is polled by the host processor at a regular frequency and the service register data and state register data is provided when the CS line is selected.

19. The method of claim 11 wherein the optical sensor is polled by the host processor continuously and the service register data and state register data are provided when the CS line is selected.

20. The method of claim 11 wherein the host processor is in a low power state with the CS line selected such that activity detected by the optical sensor triggers reporting of the service register data and state register data.

* * * * *